Sept. 28, 1926.
B. W. CRASSOLD
TRACTOR WHEEL LUG
Filed Jan. 23, 1925
1,601,296
Fig.1.
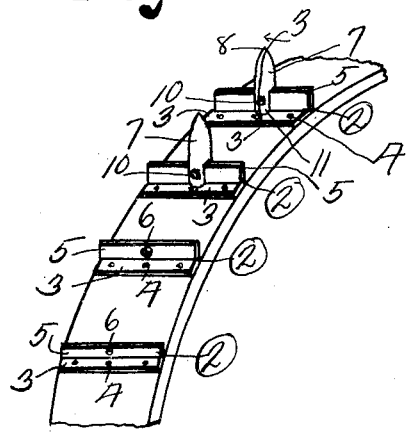
Fig.2.
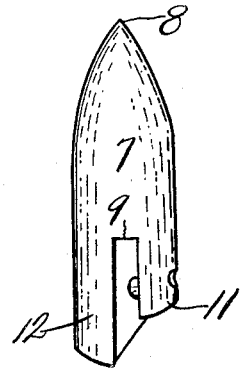
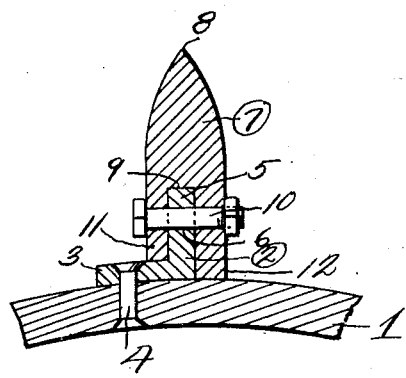
Fig.3.
INVENTOR.
B. W. Crassold
BY
ATTORNEY.

Patented Sept. 28, 1926.

1,601,296

UNITED STATES PATENT OFFICE.

BERTRAM W. CRASSOLD, OF YORKSHIRE, IOWA, ASSIGNOR OF ONE-HALF TO WILLIAM J. TURK, OF MINDEN, IOWA.

TRACTOR-WHEEL LUG.

Application filed January 28, 1925. Serial No. 5,374.

The invention relates to tractor wheel lugs, and has for its object to provide a lug which may be easily and quickly attached to the transversely disposed flanges of a tractor wheel for preventing slipping of the wheel when it moves over ground covered by sleet or ice, or over any other material which would cause slipping of the wheel.

A further object is to provide a lug carried by the transversely disposed flange of the angle bar secured to the wheel rim, and which lug is provided with a recess for the reception of the flange and arms engaging the rim of the wheel and the outer face of the flange of the angle bar, and through which arms and the transversely disposed flange a bolt extends. The engagement of the arms with the rim, and flange prevents bending of the transversely disposed flange as the lug moves into engagement with the ground.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of a portion of a tractor wheel rim showing lugs applied thereto.

Figure 2 is a perspective view of the lug.

Figure 3 is a sectional view taken on line 3—3 of Figure 1.

Referring to the drawing, the numeral 1 designates a portion of a conventional form of rim of a tractor wheel, which rim is provided with a plurality of spaced transversely disposed angle bars 2, the flanges 3 of which are secured to the rim by means of rivets 4. The flanges 5 of the angle bars 2 are radially disposed in relation to the wheel, and transversely disposed in relation to the rim 1, and are provided with apertures 6, substantially centrally thereof.

The lug 7 is relatively long and has its outer end 8 pointed and will dig into the ground or ice and will prevent spinning or skidding of the wheel. The inner end of the lug is provided with a bifurcation 9 in which the flange 5 of the angle bar is received and tightly held by means of the bolt 10, which extends through the flange 5 and the arms 11 and 12 of the lug on opposite sides of the flange. The arm 11 engages the outer face of the flange 3 of the angle bar and the arm 12 engages the outer periphery of the tractor wheel rim 1; therefore it will be seen that the angle bar will be thoroughly braced and particularly the flange 5 braced against bending as the lug moves into engagement with the ground during the rotation of the wheel which has been a common difficulty with lugs as at present constructed. It will be noted that the arm 11 has a relatively wide bearing surface on the flange 3, therefore the lug is thoroughly braced at all times.

From the above it will be seen that a tractor wheel lug is provided which may be easily and quickly applied to a tractor wheel and removed as desired. It will also be seen that the lug is thoroughly braced in a manner whereby it will not bend the radially disposed flange 5 of the angle bar 2.

The invention having been set forth what is claimed as new and useful is:—

The combination with a transversely disposed angle bar, one flange of said angle bar being secured to the outer periphery of a wheel rim, of a lug, said lug having its inner end provided with a recess in which the other flange of the angle bar is disposed, said recess forming spaced arms engaging opposite sides of the last named flange, a securing bolt extending through said arms and last named flange, one of said arms having its inner end engaging the outer face of the first mentioned flange, the other arm engaging the rim of the wheel and in combination with the first mentioned arm bracing the flange to which the lug is secured.

In testimony whereof I affix my signature.

BERTRAM W. CRASSOLD.